United States Patent [19]

Jeong

[11] Patent Number: 5,016,211

[45] Date of Patent: May 14, 1991

[54] NEURAL NETWORK IMPLEMENTATION OF A BINARY ADDER

[75] Inventor: Ho-sun Jeong, Taegu, Rep. of Korea

[73] Assignee: Samsung Electronics Co., Ltd., Kyunggi-do, Rep. of Korea

[21] Appl. No.: 473,654

[22] Filed: Feb. 1, 1990

[30] Foreign Application Priority Data

Feb. 2, 1989 [KR] Rep. of Korea ............ 89-1369

[51] Int. Cl.⁵ .................................... G06F 7/50
[52] U.S. Cl. .................................... 364/786
[58] Field of Search .................... 364/784–786; 307/365, 368, 369, 371, 372

[56] References Cited

U.S. PATENT DOCUMENTS

| | | | |
|---|---|---|---|
| 4,651,296 | 3/1987 | Koike | 364/784 |
| 4,660,166 | 4/1987 | Hopfield | 364/807 |
| 4,904,881 | 2/1990 | Castro | 307/471 X |

OTHER PUBLICATIONS

"A Reconfigurable CMOS Neural Network" by Hans Peter Graf et al., ISSCC 90/Feb. 15, 1990.
"A BiCMOS Analog Neural Network with Dynamically Updated Weights" by Takayuki Morishita et al., ISSCC 90/Feb. 15, 1990.

*Primary Examiner*—Dale M. Shaw
*Assistant Examiner*—Tan V. Mai
*Attorney, Agent, or Firm*—Cushman, Darby & Cushman

[57] ABSTRACT

A binary adder is provided for adding-processing in a high speed parallel manner two N bit binary digits. The binary adder is implemented using neural network techniques and includes a number of amplifiers corresponding to the N bit output sum and a carry generation from the result of the adding process; an augend input-synapse group, an addend input-synapse group, a carry input-synapse group, a first bias-synapse group a second bias-synapse group an output feedback-synapse group and inverters. The binary adder is efficient and fast compared to conventional techniques.

12 Claims, 3 Drawing Sheets

5,016,211

NEURAL NETWORK IMPLEMENTATION OF A BINARY ADDER

FIELD OF THE INVENTION

The present invention relates to a binary adder, and particularly to a binary adder using a neural network in order to simplify the construction of the adder and in order to improve the operating speed.

BACKGROUND OF THE INVENTION

Despite the development of faster processing speeds, today's digital computer has been gradually recognized as being very unsuitable for the process requiring integrated judgment and intelligence.

The human brain is known to process data in associative memory and in parallel, and is able to recognize and memorize using partial information.

A worldwide effort is being undertaken to create a neural computer, modeling the computer after the parallel-process and the associative memory of the human brain.

About fifty kinds of the neural circuit models have been published up to now. J. J. Hopfield, in 1982, of Caltech proposed a neural network modeled after associative memory-processing and showed the possibility of constructing hardware by applying analog circuits and VLSI technologies to this neural network model (J. J. Hopfield, Proc. Natl. Acad. Sci. U.S.A., Vol. 79, PP2554~2558, April 1982).

Also, J. J. Hopfield, in 1986, explained an A/D converter by way of example, suggesting the model for solving the optimization problem (D. W. Tank and J. J. Hopfield, IEEE. Transactions on circuit and systems, Vol. CAS-33, No. 5, May 1986).

However, the above A/D converter circuit was unstabled due to the occurrence of two local Minima for each stage. Therefore the above A/D converter circuit had to be designed to be supplemented with a special complementary circuit in order to stabilize the circuit.

Because computer arithmetic operations are carried out by sequential addition, the time consumed during the adding process becomes significant.

Therefore adder designs of known digital circuits utilize the carry look ahead generator circuit in order to reduce the carry propagation delay time and to process the operation of each stage in a parallel manner.

Therefore, to construct a parallel adder of N-bits, the carry look ahead generator circuit of an N-bit full adder requires a gate number proportional to N.

In a VLSI implementation of this above described binary adder, the VLSI area required is proportional to the size of the number of bits in the adder. It would be desirable to reduce the required VLSI area.

SUMMARY OF THE INVENTION

It is an object of the present invention to provide a binary adder which is simple in circuit construction and very fast in processing speed.

It is another object of the present invention to provide a binary adder using a neural model having Unidirectional Feedback Type.

It is an other object of the present invention to provide a binary adder which can be embodied in a VLSI neural network.

To achieve the above mentioned objectives, a binary adder is provided for adding-processing in a parallel manner two N bit binary digits. The binary adder according to the present invention, includes amplifiers having the number corresponding to the sum output of N bits and a carry generation from the result of the above adding process;

augend input-synapse group for commonly connecting a first power voltage to an input line of each amplifier with the connecting-weight value corresponding to each binary bit value of the N bit augend input;

addend input-synapse group for commonly connecting a first power voltage to an input line of each amplifier with the connecting-weight value corresponding to each bit value of the binary addend of above mentioned N bits;

carry input-synapse group for commonly connecting a first power voltage to an input line of each amplifier with the connecting-weight value of a reference weighting value according to the carry input;

A first bias-synapse group for commonly connecting a second power voltage to an input line of each amplifier with the connecting-weight value of the sum output and a carry bit generated when the above power voltage is applied;

a second bias-synapse group for commonly connecting the first power voltage to an input line of each amplifier with the connecting-weight value of the reference weighting value when the second power voltage is applied;

an output feedback-synapse group for commonly connecting the second power voltage to an input line of each lower bit amplifier with the connecting-weight value according to the output of the upper bit amplifier.

inverters for inverting outputs of the amplifiers.

The input-synapse and second biase-synapse are composed of PMOS transistor, and the first bias-synapse and the feedback-synapse is composed of NMOS transistors.

The connecting-weight value of each synapse is defined as the conductance value, i.e., on-resistance of the MOS transistors which are based on the geometrical aspect ratio width/length (W/L) of the MOS transistor.

The binary adder of this present invention can reduce the required area in a VLSI embodiment because there is no necessity for having the carry look ahead generator circuit, unlike prior digital circuit adders.

Also, the feedback-synapse number can be reduced by half compared with prior Hopfield models. These objects and features of the invention will become more readily apparent from the following detailed description and from the drawings.

DESCRIPTION OF THE PREFERRED EMBODIMENT

Figure 1:
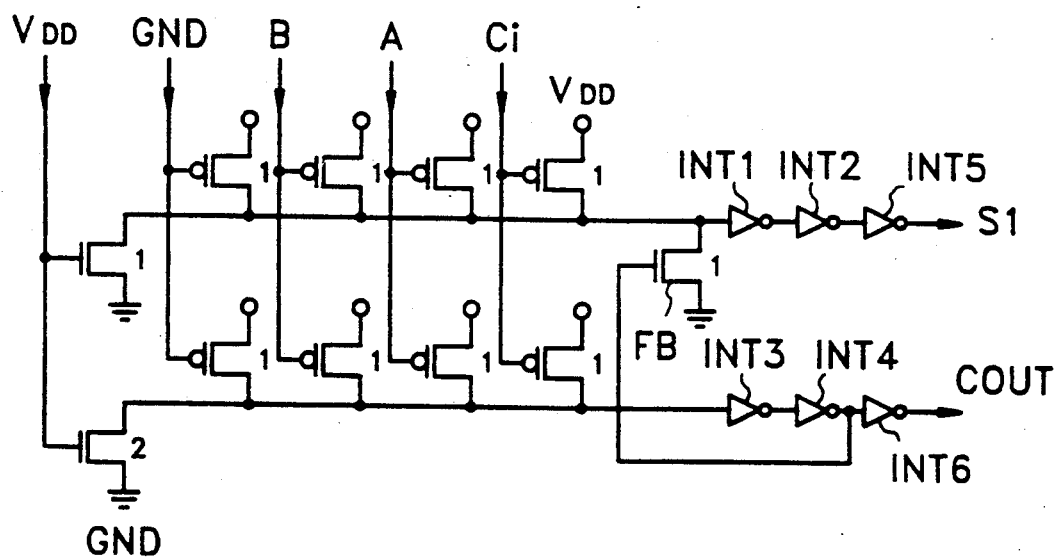
FIG. 1 is a circuit diagram of full adder showing one embodiment of the present invention.

FIG. 1 is a circuit diagram of a full adder showing one embodiment of the present invention. A full adder is a circuit having three inputs and two outputs as shown in FIG. 1. FIG. 1 shows an input stage and an output stage, and the feedback stage of feeding back the MSM output to the MSB.

The output stage comprises the buffer amplifier U1 serially connecting two CMOS inverters INT1 and INT2 to output the result of the adding process, and the buffer amplifier U2 serially connecting two CMOS inverters INT3 and INT4 to output the carry generated by the adding process, and CMOS inverters INT5 and INT6 for converting the output of above each buffer amplifier.

The augend A is commonly applied to the gate electrodes of two PMOS transistors. The source electrodes are connected to the first power source voltage $V_{DD}$ and the drain electrodes are respectively connected to the input lines L1 and L2 of each buffer amplifier U1 and U2.

The addend B is commonly applied to the gate electrode of two PMOS transistors; the source electrodes are connected to the first power source voltage $V_{DD}$ and the drain electrodes are respectively connected to the input lines L1 and L2 of the each buffer amplifier U1 and U2.

The carry input Ci is commonly applied to the gate electrodes of two PMOS transistors; the source electrodes are connected to the first power source voltage $V_{DD}$ and the drain electrodes are respectively connected to the input lines L1 and L2 of each buffer amplifer U1 and U2.

The second power source voltage (GND) is applied to the source electrodes and the first power source voltage $V_{DD}$ is applied to the gate electrodes of two NMOS transistors respectively connecting the drain electrodes to the input lines L1 and L2 of each buffer amplifier U1 and U2, also, the first power source voltage $V_{DD}$ is applied to a source electrodes and the second power source voltage (GND) is applied to the gate electrodes of two PMOS transistors respectively connecting drain electrodes to the input lines L1 and L2 of each buffer amplifier U1 and U2.

The second power source voltage is applied to a source electrode and the output of the carry generate-buffer amplifier U2 is applied to a gate electrode of a feedback NMOS transistor FB connecting a drain electrode to the input line L2 of the sum input-buffer amplifier U1.

The PMOS transistors to which the augend A, addend B and carry Ci are applied function as the input-synapse, and the connecting-weight value of these input-synapses is established as a conductance value of 1 by making the geometrical aspect ratio W/L of the PMOS transistor in the ratio of 5 $\mu$m/2 $\mu$m.

Also, the PMOS transistors to which the second power source voltage (GND) is applied function as the second bias-synapse and has the same connecting-weight value as above-described input-synapse.

The NMOS transistors to which the first power source voltage $V_{DD}$ is applied function as the first bias-synapse, and the NMOS transistor connected to input line L1 is given a conductance value of 1 by making the geometrical aspect ratio W/L in the ratio of 2 $\mu$m/2 $\mu$m, and the NMOS transistor connected to the input line L2 is given a conductance value of 2 by making the geometrical aspect ratio W/L in the ratio of 4 $\mu$m/2 $\mu$m, and therefore the weighting value of each input line L1 and L2 is applied.

Also the feedback-NMOS transistor FB connected to the input line L1 is given a weighting value of the feedback output bit, i.e., the geometrical aspect ratio W/L having a conductance value of 2.

The operation of above-described full adder is explained as follows.

For the above-described PMOS, a conductance value is determined to be 1 by making W/L value in the ratio of 5/2, and to above-described NMOS, a conductance value is determined to be 1 by making W/L value in the ratio of 2/2, respectively.

Therefore, when the ratio of W/L value in PMOS and NMOS is same, if the first power voltage is 5 V, the output has a lower value than 2.5 V.

As a first step, when 0 V is applied to the three inputs, the sum of the connecting-weight value of PMOS in the synapse part of the input line L2 becomes 4 and the sum of the connecting-weight value of NMOS becomes 2.

Therefore, the voltage of an input line of the buffer amplifier U2 gets to be somewhat higher than 2.5 V, and by inverting the high voltage passed through the buffer amplifier U2 through the inverter, the output becomes 0 V.

Also, the NMOS transistor connected to a input line L1 is turned-on by the high state of an output of the buffer amplifer U2.

Therefore the sum of a connecting-weight value of PMOS in the synapse part of a input line L1 becomes 4, and the sum of a connecting-weight value of NMOS becomes 3 and as the voltage of an input line gets to be high state somewhat higher than 2.5 V, the output becomes 0 V by inverting the high voltage passed through the buffer amplifier U2 through the inverter.

Hence, by applying all random values to a three input stages, full adder can be known to operate as shown Table 1.

TABLE 1

| Input | | | The ratio of connecting weight value of synapse | | Buffer amplifier output | | Output | |
|---|---|---|---|---|---|---|---|---|
| | | | L1 | L2 | | | | |
| A | B | Ci | PMOS:NMOS | PMOS:NMOS | U1 | U2 | S | Cout |
| 0 | 0 | 0 | 4:3 | 4:2 | 1 | 1 | 0 | 0 |
| 0 | 0 | 1 | 3:3 | 3:2 | 0 | 1 | 1 | 0 |
| 0 | 1 | 0 | 3:3 | 3:2 | 0 | 1 | 1 | 0 |
| 0 | 1 | 1 | 2:1 | 2:2 | 1 | 0 | 0 | 1 |
| 1 | 0 | 0 | 3:3 | 3:2 | 0 | 1 | 1 | 0 |
| 1 | 0 | 1 | 2:1 | 2:2 | 1 | 0 | 0 | 1 |
| 1 | 1 | 0 | 2:1 | 2:2 | 1 | 0 | 0 | 1 |
| 1 | 1 | 1 | 1:1 | 1:2 | 0 | 0 | 1 | 1 |

Figure 2:
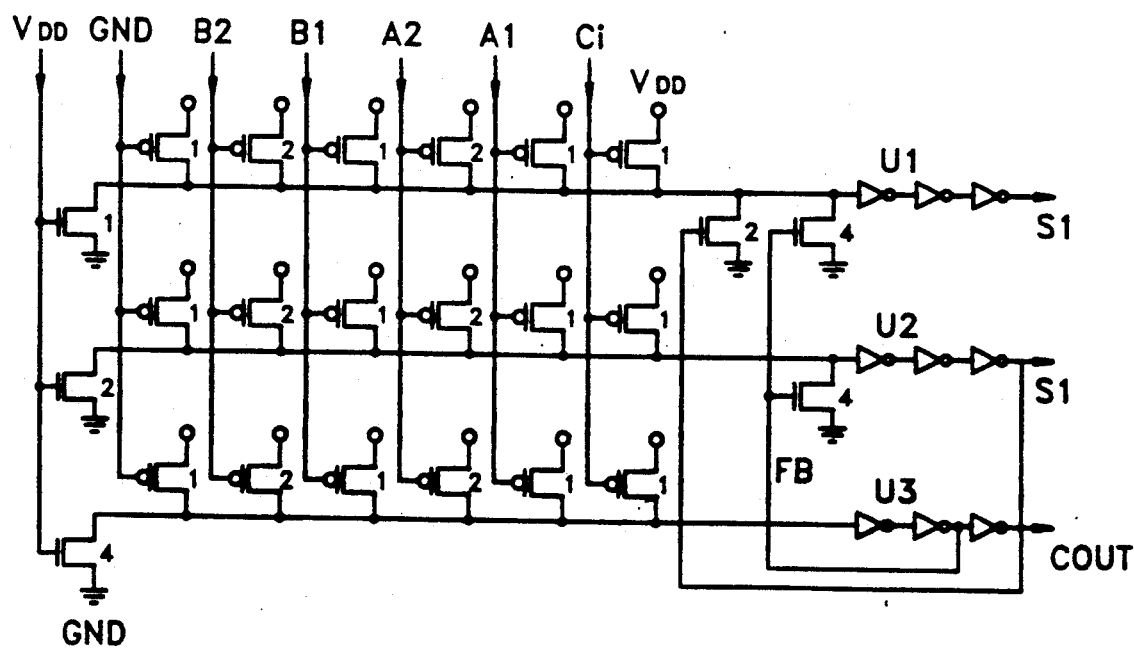
FIG. 2 is a circuit diagram of 2-bit parallel adder showing one embodiment of the present invention.
Figure 3:
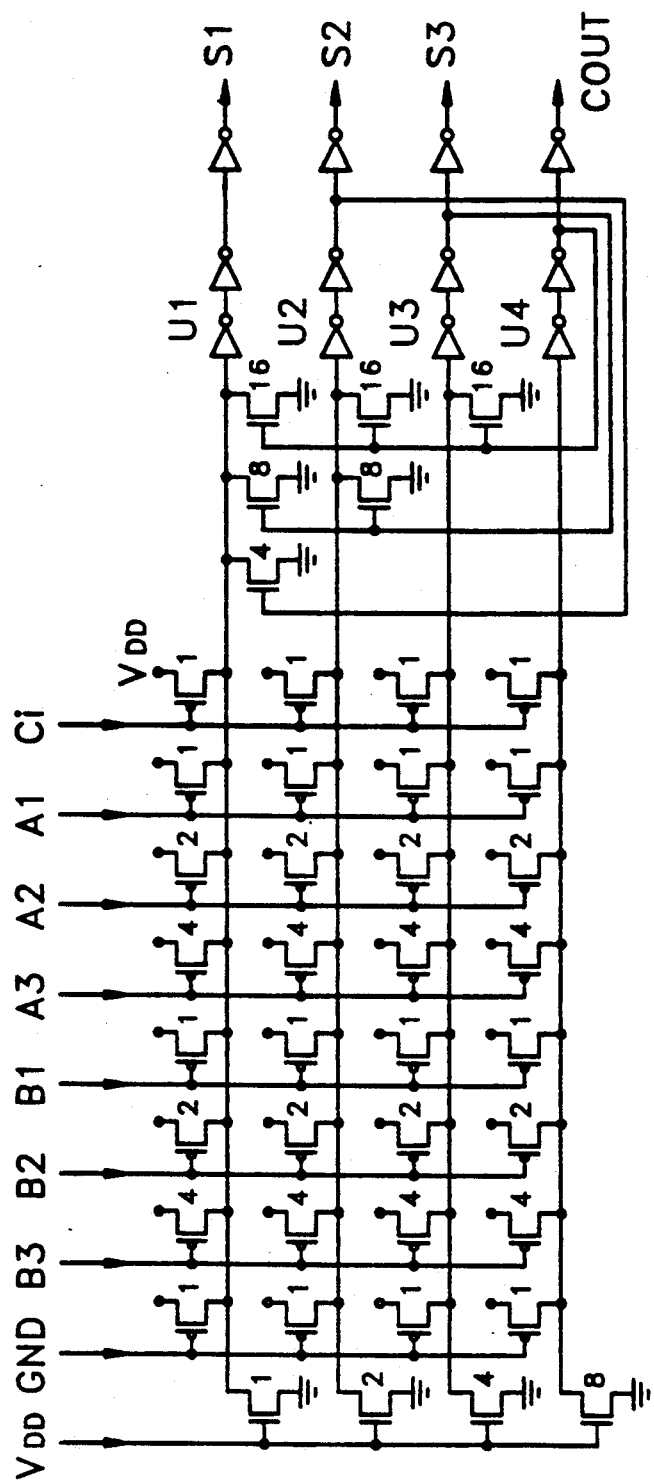
FIG. 3 is a circuit diagram of 3-bit parallel adder showing one embodiment of the present invention.
Figure 4:
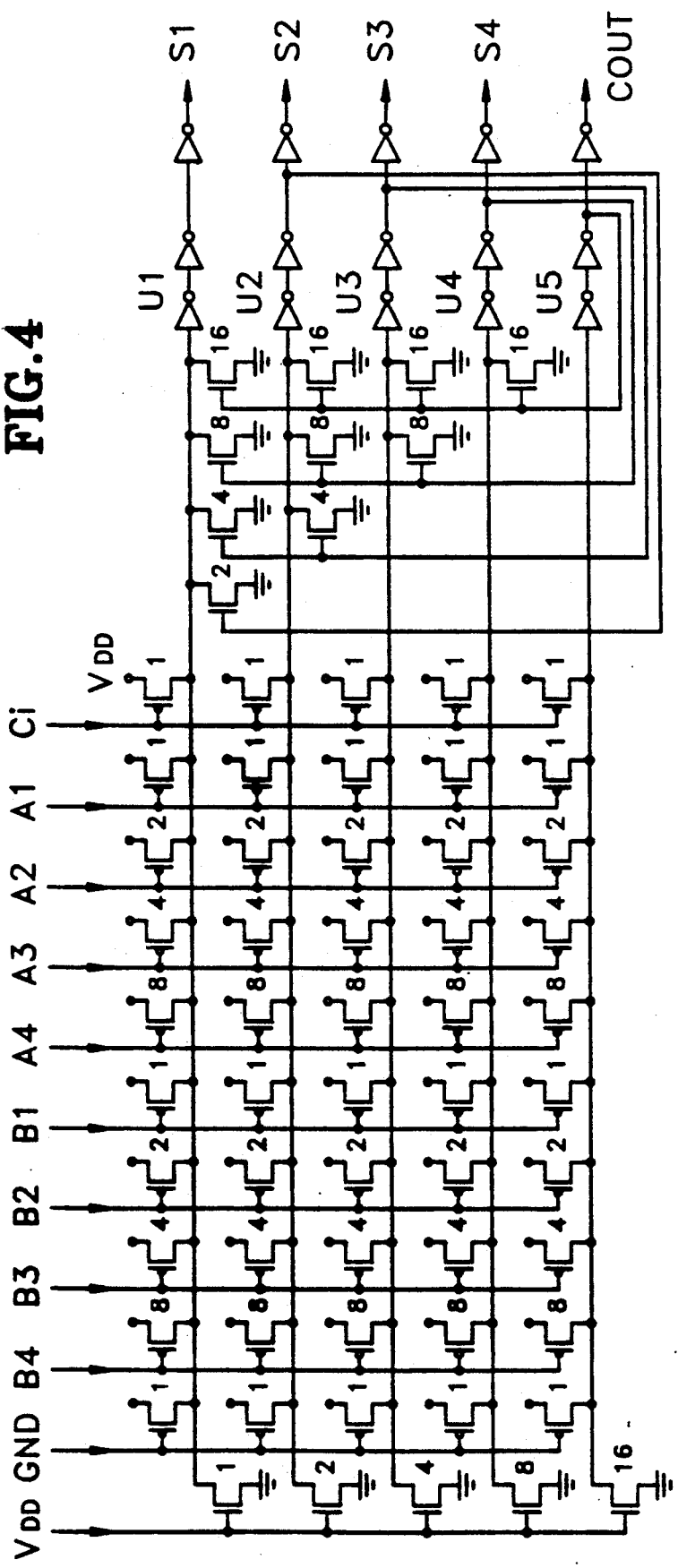
FIG. 4 is a circuit diagram of 4-bit parallel adder showing one embodiment of the present invention.

FIGS. 2-4 are circuit diagrams of 2 bit, 3 bit and 4-bit adder showing one embodiment of the present invention, respectively.

In the present invention as shown FIGS. 2-4, the buffer amplifier increases one stage by one stage according to the number of augend and addend increases, and the input-synapse part increases corresponding to each bit of augend and addend, and the connecting-weight value of the input-synapse corresponds to a weighting value of each input bit.

Also, each input line of the buffer amplifier is biased by the weighting value according to the value of each output bit, by the first bias-synapse.

And the connecting-weight value of a feedback-synapse of feeding back the upper bit buffer amplifiers into each input line of the lower bit buffer amplifiers is established by corresponding to the weighting value of the upper bit feedback.

Therefore, in the same way as the operating principle of above-described full adder, the circuit operation is determined by the difference of connecting-weight value of PMOS and NMOS of each stage.

In the embodiment when the connecting-weight value of PMOS and NMOS which is respectively 1 becomes same by making W/L value in the ratio of 5/2:2/2, NMOS is established to be superior, but, when the connecting-weight value is same by making W/L value of PMOS in the ratio of 6 $\mu$m/2 $\mu$m and by making W/L value of NMOS in the ratio of 2 $\mu$m/2 $\mu$m, PMOS can be established to be superior.

The geometric parameter W/L which is ratio of the channel width W to the length L of the MOS transistor specifies its conductance.

In the present invention as shown in the above, by comprising a parallel binary adder using the neural circuit model of a unidirectional feedback type which feeds back from the upper bit buffer amplifiers only to the lower bit buffer amplifiers, the amount of logic utilized can be reduced relative to that used by prior Hopfield model, and the addition of a special complementary circuit is not required.

Also, because the logic required can be reduced on a large scale, compared with prior digital type the required area can be reduced in the VLSI embodiment, and, without the need for a carry look ahead generator circuit, the arithmatic adding process can be carried out at a high speed.

What is claimed is:

1. A binary adder for adding-processing in a parallel manner two N bit binary digits, an augend and an addend, and a carry in and outputting an N bit output sum and a carry out comprising:
   (N+1) output buffer amplifiers corresponding to the N bit output sum and the carry out resulting from said adding-processing;
   augend input-synapse group means for coupling a first power source voltage to an input line of said each output buffer amplifier, according to a value of the augend, with a connecting weight value corresponding to each binary bit value of the N bit binary augend input;
   addend input-synapse group means for coupling the first power source voltage to the input line of said each output buffer amplifier, according to the value of the addend, with a connecting weight value corresponding to each binary bit value of the binary addend input;
   carry input-synapse group means for coupling the first power source voltage to the input line of said each output buffer amplifier, according to a value of the carry in, the with a connecting weight value of a reference weighting value according to the carry input;
   first bias-synapse group means for coupling a second power source voltage to the input line of said each output buffer amplifier with the connecting weight value of a binary value of said output sum and carry bit;
   second bias-synapse group means for coupling said first power source voltage to the input line of said each output buffer amplifier teach with a connecting weight value of a reference weighting value;
   an output feedback-synapse group means for coupling said second power source voltage to the input line of each lower bit output buffer amplifier, according to the value of each upper bit output buffer amplifier, with a connecting weight value corresponding to the binary output value each upper bit output buffer amplifier; and
   means for inverting outputs of said output buffer amplifiers.

2. A binary adder as claimed in claim 1, wherein said input-synapse and second bias-synapse are made of PMOS transistors, and said first bias-synapse and feedback-synapse are made of NMOS transistors.

3. A binary adder as claimed in claim 2, wherein the connecting-weight value of said each synapse is established as a conductance value of MOS transistor.

4. A binary adder as claimed in claim 3, wherein a conductance value of said MOS transistor is established as a geometrical aspect ratio (width/length) of MOS transistor.

5. A binary adder as claimed in claim 4, wherein a conductance value of said MOS transistor is established by uniformly fixing the channel length L of a geometrical aspect ratio W/L of MOS transistor and by changing the channel width W to a multiple of each bit weighting value 1,2,4,8, . . . of a binary number.

6. A binary adder as claimed in claim 5, wherein a conductance value is 1 by making a geometrical aspect ratio W/L of said PMOS transistor in the ratio of 5 $\mu$m/2 $\mu$m and a conductance value is 1 by making a geometrical configuration ratio W/L of said NMOS transistor in the ratio of 2 $\mu$m/2 $\mu$m.

7. A binary adder as claimed in claim 1, wherein said amplifier comprises two CMOS inverters serially-connected.

8. A binary adder for adding input of two N bit binary digits, addend and augend, and a carry in, and outputting an N bit sum and a carry out comprising:
   (N+1) output buffer amplifiers corresponding to the N bit sum and the carry out;
   input-synapse group means for coupling a first power source voltage to an input line of said each output buffer amplifier, according to the value of the input;
   bias-synapse group means for biasing the input line of said each output buffer amplifier to a predetermined voltage level;
   output feedback-synapse group means for coupling a second power source voltage to the input line of each lower bit output buffer amplifier, according to the value of each upper bit output buffer amplifier, with a connecting weight value corresponding to the binary output value of each upper bit output buffer amplifier; and
   means for inverting outputs of said output buffer amplifiers.

9. A binary adder as claimed in claim 8 wherein said input-synapse group means comprises:
   augend input-synapse group means for coupling a first power source voltage to an input line of said each output buffer amplifier, according to a value of the augend, with a connecting weight value corresponding to each binary bit value of the N bit binary augend input;
   addend input-synapse group means for coupling the first power source voltage to the input line of said each output buffer amplifier, according to the value of the addend, with a connecting weight value corresponding to each binary bit value of the binary addend input; and
   carry input-synapse group means for coupling the first power source voltage to the input line of said each output buffer amplifier, according to a value of the carry in, with a connecting weight value of a reference weighting value according to the carry input;

10. A binary adder as claimed in claim 9, wherein said input-synapse means is made of PMOS transistors and feedback synapse means is made of NMOS transisters.

11. A binary adder as claimed in claim 9 wherein said bias synapse group means comprises:

first bias-synapse group means for coupling the second power source voltage to the input line of said each output buffer amplifier with a connecting weight value of a binary value of said output sum bit and carry out bit; and second bias-synapse group means for coupling the first power source voltage to the input line of said each output buffer amplifier teach with a connecting weight value of a reference weighting value;

12. A binary adder as claimed in claim 11, wherein first bias synapse is made of NMOS transistors and second bias-synapse group means is made of PMOS transistors.

* * * * *